US006791813B2

(12) United States Patent
Shikano et al.

(10) Patent No.: US 6,791,813 B2
(45) Date of Patent: Sep. 14, 2004

(54) COMMUNICATION LINE SURGE PROTECTING SYSTEM

(75) Inventors: Takashi Shikano, Fukuoka (JP); Kiyotaka Ando, Fukuoka (JP); Chikashi Okabayashi, Tokyo (JP)

(73) Assignees: NTT Docomo Kyushu, Inc., Fukuoka (JP); Sankosha Corporation, Tokyo (JP)

( * ) Notice: Subject to any disclaimer, the term of this patent is extended or adjusted under 35 U.S.C. 154(b) by 110 days.

(21) Appl. No.: 10/226,313

(22) Filed: Aug. 23, 2002

(65) Prior Publication Data

US 2003/0043524 A1 Mar. 6, 2003

(30) Foreign Application Priority Data

Sep. 6, 2001 (JP) ........................................ 2001-269874

(51) Int. Cl.[7] .................................................. H02H 1/00
(52) U.S. Cl. ........................................ 361/119; 361/111
(58) Field of Search ................................ 361/110, 111, 361/117–119, 129, 130; 333/12, 202, 206, 245, 260

(56) References Cited

U.S. PATENT DOCUMENTS 4,985,800 A * 1/1991 Feldman et al. ............ 361/113
5,844,766 A * 12/1998 Miglioli ...................... 361/119
6,636,407 B1 * 10/2003 Ryman ........................ 361/119

* cited by examiner

*Primary Examiner*—Ronald W. Leja
(74) *Attorney, Agent, or Firm*—Westerman, Hattori, Daniels & Adrian, LLP

(57) ABSTRACT

The present invention relates to a communication line surge protecting system in which a quarter wavelength open circuit for a wavelength used is disposed in each of a central conductor line 1 and an external conductor line 2 so as to allow a signal with a predetermined communication wavelength to pass therethrough, while blocking signals with frequency components of lighting surge and the like, and in which a ground line is further provided in the central conductor line and a quarter wavelength short circuit for the wavelength used is disposed in each of the ground line and the external conductor line so as to block the signal with the predetermined communication wavelength, while allowing the signals with the frequency components of lighting surge and the like to pass therethrough. The signal of the predetermined wavelength used passes through the communication line and is insulated from the ground. On the other hand, the signals for lighting surge and the like which have frequencies different from the predetermined one are hindered from passing through the communication line and are connected to the ground, to which the lighting surge is discharged. Therefore, connection equipment can be safely and reliably protected from lighting surge to obtain a good and reliable communication signal with few losses.

3 Claims, 1 Drawing Sheet

COMMUNICATION LINE SURGE PROTECTING SYSTEM

FIELD OF THE INVENTION

The present invention relates to a communication line surge protecting system that protects a communication line, communication equipment, or the like from lighting surge and the like induced in the communication line.

BACKGROUND OF THE INVENTION

Efforts have hitherto been made to protect a communication line, connection equipment, or the like from damage caused by lighting surge and the like induced in the communication line. In this conventional lighting surge protecting system, a lighting arrester such as a gas tube arrester is disposed between an outer circumference of a central conductor of a coaxial connector and an inner circumference of an external conductor. Thus, lighting surge and the like induced in the communication line are discharged and grounded by the lighting arrester to protect the communication line, connection equipment, or the like from lighting surge and the like.

However, in the above described conventional lighting surge protecting system, a temporal delay in operation occurs after lighting surge and the like have invaded into the communication line and before the lighting arrester performs a discharge operation. As a result, lighting surge associated with the temporal delay in operation of the lighting arrester may invade into the communication line or connection equipment, thereby disadvantageously damaging the connection equipment or the like.

Further, since the lighting arrester is connected between the outer circumference of the central conductor of the coaxial line and the inner circumference of the external conductor, a capacity is added to this portion to disadvantageously increase losses to the communication line, thereby narrowing a frequency band.

It is an object of the present invention to solve the problems with the above described conventional lighting surge protecting system and to provide a communication line surge protecting system which allows, for a communication line, a signal with a predetermined frequency to pass therethrough, while blocking signals with the frequency components of lighting surge and the like and which allows, for the ground, the signals with the frequency components of lighting surge and the like to pass therethrough for grounding, while blocking the signal with the predetermined frequency.

SUMMARY OF THE INVENTION

To accomplish the above object, first, a quarter wavelength open circuit for a wavelength used is disposed in each of a central conductor line 1 and an external conductor line 2 so as to allow a signal with a predetermined communication wavelength to pass therethrough, while blocking signals with frequency components of lighting surge and the like, and in which a ground line is further provided in the central conductor line and a quarter wavelength short circuit for the wavelength used is disposed in each of the ground line and the external conductor line so as to block the signal with the predetermined communication wavelength, while allowing the signals with the frequency components of lighting surge and the like to pass therethrough for grounding. Second, the quarter wavelength open circuit for the wavelength used is constructed by interposing an insulator with a length one fourth of the wavelength used, into each of the central conductor line and the external conductor line. Third, the quarter wavelength open circuit for the wavelength used is constructed by dividing each of the central conductor line and the external conductor line into pieces and interposing an insulator between the pieces of each of the central conductor line and the external conductor line.

DETAILED DESCRIPTION OF THE PREFERRED EMBODIMENTS

Figure 1:
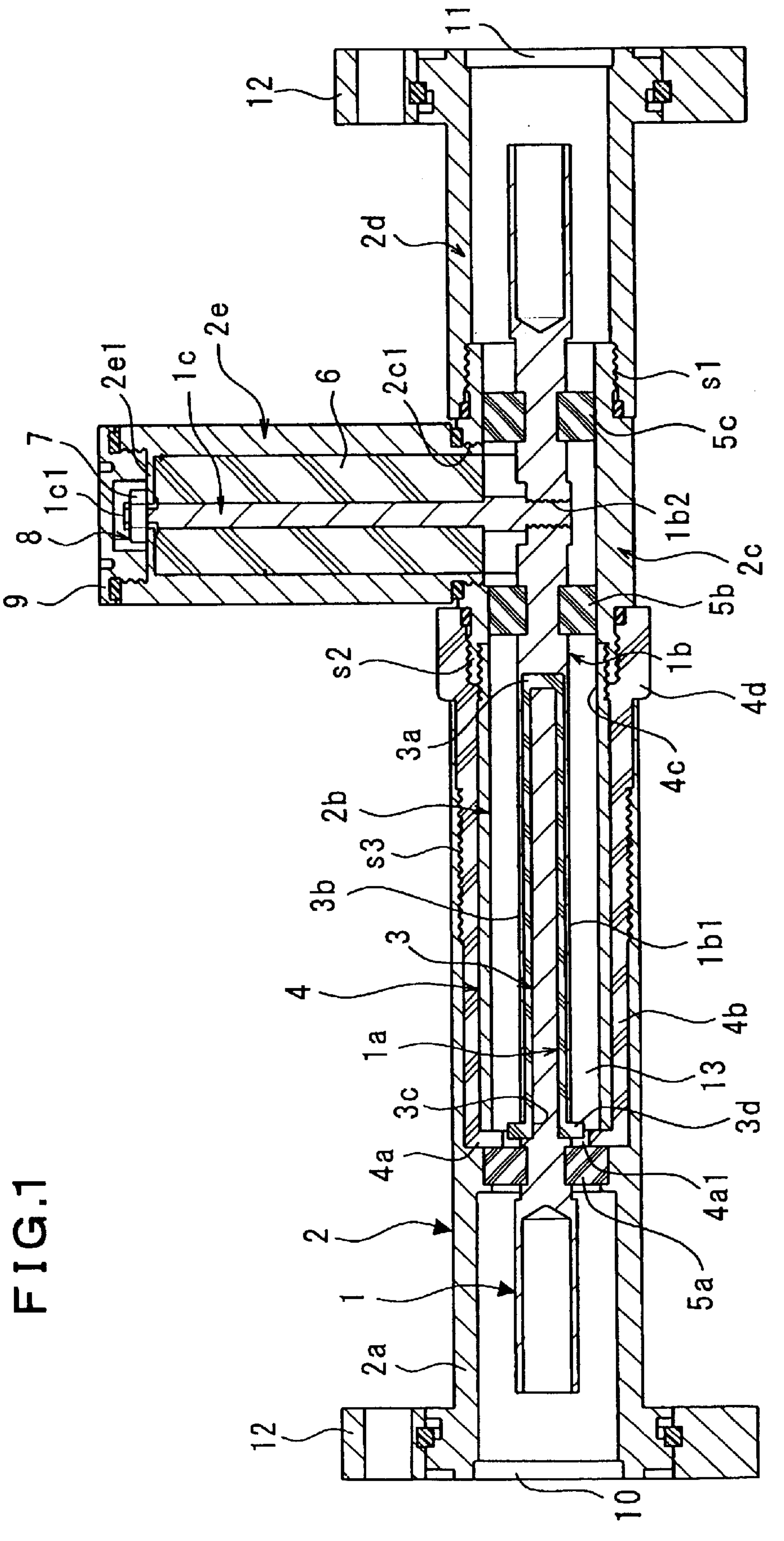
FIG. 1 is a vertical sectional view of a communication line surge protecting system as an embodiment of the present invention.

An embodiment of the present invention will be described below. However, the present invention is not limited to this embodiment as long as the spirits thereof are observed.

1 is a central conductor line of a communication line. The central conductor line 1 is composed of a cylindrical first divided central conductor line 1*a*, a second central conductor line 1*b* arranged concentrically with the first divided central conductor line 1*a* and having a cylindrical portion 1*b*1 at a tip portion thereof, and a third central conductor line 1*c* screwed in a through-hole 1*b*2 drilled in the second central conductor line 1*b*, the third central conductor line 1*c* extending perpendicularly to the first divided central conductor line 1*a* and the second central conductor line 1*b*.

2 is an external conductor line of the communication line. The external conductor line 2 has a cylindrical first divided external conductor line 2*a*, a cylindrical second divided external conductor line 2*b* having a smaller diameter than the first divided external conductor line 2*a*, a cylindrical third divided external-conductor line 2*c*, and a cylindrical fourth divided external conductor line 2*d*. The first divided external conductor line 2*a*, the second divided external conductor line 2*b*, the third divided external conductor line 2*c*, and the fourth divided external conductor line 2*d* are concentrically arranged.

Further, the external conductor line 2 has a fifth divided external conductor line 2*e* screwed in a through-hole 2*c*1 drilled in a circumferential wall of the third divided external conductor line 2*c*, the fifth divided external conductor line 2*e* extending at right angles to the first divided external conductor line 2*a*, the second divided external conductor line 2*b*, the third divided external conductor line 2*c*, and the fourth divided external conductor line 2*d*.

Furthermore, an end of the third divided external conductor line 2*c* is screwed in an end of the fourth divided external conductor line 2*d* at a screwed portion s1. An end of the second divided external conductor line 2*b* is screwed in the other end of the third divided external conductor line 2*c* at a screwed portion s2.

3 is a central insulator composed of a dielectric or the like. The central insulator 3 has a cylinder 3*b* having a side wall 3*a* at one end thereof, and a flange portion 3*d* formed at an opening 3*c* in the cylinder 3*b*.

The cylindrical first divided central conductor line 1*a* of the central conductor line 1 is inserted into the cylinder 3*b* of the central insulator 3 so that an end surface of the first divided central conductor line 1*a* abuts against the side wall 3*a* of the central insulator 3. Further, the cylinder 3*b* of the central insulator 3 is configured to be fitted into the cylindrical portion 1*b*1 of the second central conductor line 1*b*, which constitutes the central conductor line 1.

4 is an external insulator composed of a dielectric or the like. The external insulator 4 has a cylinder 4*b* formed at one end thereof and having a side wall 4*a* with a through-hole 4*a*1 drilled therein, and a larger diameter portion 4*d* formed near an opening 4*c* formed at the other end of the cylinder 4*b*, the large diameter portion 4*d* having a larger outer diameter than the cylinder 4*b*.

The cylindrical first divided external conductor line 2*a* of the external conductor line 2 and the external conductor 4 are joined together at a screwed portion s3 composed of a threaded portion formed on an inner circumferential surface of the cylindrical first divided external conductor line 2*a*, which constitutes the external conductor line 2, and a threaded portion formed on an outer circumferential surface of the cylinder 4*b* of the external insulator 4. Further, the cylindrical second divided external conductor line 2*b* of the external conductor line 2 is fitted into the cylinder 4*b* of the external insulator 4.

The larger diameter portion 4*d* of the external insulator 4 is configured to lie beyond an outer circumferential surface of the first divided external conductor line 2*a*, which constitutes the external conductor line 2. The flange portion 3*d* of the central insulator 3 is installed so as to fit into a through-hole 4*a*1 drilled in the side wall 4*a* of the external insulator 4.

5*a* is a ring-like insulating support member arranged between the first divided central conductor line 1*a*, which constitutes the central conductor line 1, and the first divided external conductor line 2*a*, which constitutes the external conductor line 2.5*b* and 5*c* are ring-like insulating support members arranged between the second central conductor line 1*b*, which constitutes the central conductor line 1, and the third divided external conductor line 2*c*, which constitutes the external conductor line 2, the ring-like insulating support members 5*b*, 5*c* being also arranged across the third central conductor line 1*c*, which constitutes the central conductor line 1.

An insulator 6 composed of a dielectric or the like is arranged between the third central conductor line 1*c*, which constitutes the central conductor line 1, and the fifth divided external conductor line 2*e*, which constitutes the external conductor line 2. An upper end portion 1*c*1 of the third central conductor line 1*c*, which constitutes the central conductor line 1, is inserted into a through-hole drilled in a ceiling portion 2*e*1 formed near an upper opening in the fifth divided external conductor line 2*e*, which constitutes the external conductor line 2.

Furthermore, a nut 7 is screwed in a threaded portion formed at the upper end portion 1*c*1 of the third central conductor line 1*c*. Then, the third central conductor line 1*c*, which constitutes the central conductor line 1, and the fifth divided external conductor line 2*e*, which constitutes the external conductor line 2, are connected together to constitute a grounding portion 8.

9 is a cover that covers the upper opening in the fifth divided external conductor line 2*e*, which constitutes the external conductor line 2.

As described above, the central conductor line 1 is provided with the third central conductor line 1*c*, which grounds the central conductor line 1. Further, the fifth divided external conductor line 2*e*, which constitutes the external conductor line 2 so as to surround the third central conductor line 1*c*, is provided so as to branch from the third divided external conductor line 2*c*. Furthermore, the third central conductor line 1*c* and the fifth divided external conductor line 2*e* are electrically connected together via the grounding portion 8.

10, 11 are joining portions that connect the central conductor line 1 and external conductor line 2 to other external conductor lines. The joining portions 10, 11 are connected to the other external conductor lines using appropriate mounting flanges 12, 12. 13 is an air portion formed between the second divided external conductor line 2*b*, which constitutes the external conductor line 2, and the second central conductor line 1*b*, which constitutes the central conductor line 1.

The insulator length of the central insulator 3 sandwiched between the first divided central conductor line 1*a* and second central conductor line 1*b*, which constitute the central conductor line 1, and the insulator length of the external insulator 4 sandwiched between the first divided external conductor line 2*a* and second divided external conductor line 2*b*, which constitute the external conductor line 2, are each set to one fourth of a wavelength used.

The quarter wavelength open circuit for the wavelength used (λ) has an insulating structure in which part of the communication line is blocked. The length of the insulator, i.e. an open line length (La) is determined as follows:

The input impedance (Zin) of the quarter wavelength open circuit is given by:

$$Zin=-jZo\times cot(2\pi La/\lambda)$$

wherein

λ=wavelength used,

La=open line length (length of the insulator), and

Zo=characteristic impedance.

It is assumed that La=λ/4 and Zo=50 ohms (Ω). Then, Zin=zero (0) Ω on the basis of the above equation. Thus, if the open line length (La) is set to be one of fourth of the wavelength used (λ), then the quarter wavelength open circuit allows a signal with a predetermined frequency (f) to pass through without any losses.

On the other hand, if a signal with a double frequency which is different from the signal with the predetermined frequency (f) invades into the communication circuit, then the wavelength of this signal is λ/2 owing to the frequency (2f), and the input impedence (Zin) of the quarter open circuit is:

$$Zin=-jZo\times cot((2\pi(\lambda/4))/(\lambda/2))$$

$$Zin=\infty(\Omega)$$

Hence, the quarter wavelength open circuit exhibits a high impedence, i.e. a very marked insulating characteristic for signals other than one with the predetermined frequency f, i.e. signals other than the frequency signal which correspond to lighting surge and the like. Accordingly, the quarter wavelength open circuit hinders the passage of signals other than the signal with the predetermined frequency (f). That is, the grounding portion 8 of the quarter wavelength open circuit discharges lighting surge and the like, i.e. signals with frequencies other than the predetermined frequency f, to the ground.

More specifically, if a communication circuit has a signal frequency (f) of 3 gigaherzs (GHz), the wavelength (λ) corresponding to this signal frequency is 10 centimeters (cm) as shown in the equation below. The insulator of the quarter wavelength open circuit is 2.5 cm long.

$$\lambda=c/f=3\times10^8/3\times10^9=0.1 \text{ meters } (m)$$

$$\lambda/4=0.1/4=0.025\ (m)$$

wherein

λ=wavelength used, c=speed (≈3×10$^8$), and f=signal frequency.

That is, a signal with a communication frequency of 3 GHz passes through the quarter wavelength open circuit without any losses.

Then, a quarter wavelength short circuit will be described. The input impedance (Zin) of the quarter wavelength short circuit is given by:

$$Zin=+jZo\times\tan(2\pi Lb/\lambda)$$

wherein

λ=wavelength used,

Lb=short circuit line length, and

Zo=characteristic impedance.

It is assumed that Lb=λ/4 and Zo=50 Ω. Then the following equation is given:

$$Zin=+jZo\times\tan((2\pi(\lambda/4))/\lambda)=\infty(\Omega)$$

Accordingly, if the length of the insulator (short circuit line length) Lb equals one fourth of the wavelength used, the quarter wavelength short circuit exhibits, for the signal frequency (f), an input impedance corresponding to infinite resistance, thereby hindering the passage of the signal frequency (f).

On the other hand, the quarter wavelength short circuit exhibits a low impedance for signals for lighting surge and the like, which have frequencies different from the signal frequency (f). Thus, the signals with these frequency components pass through the circuit, i.e. flow from the central conductor line 1 via the grounding portion 8 to the ground.

Next, the quarter wavelength open circuit has an insulating structure in which the communication line is blocked. In the quarter wavelength open circuit of the present invention, the insulation distance to be protected from lighting surge and the like varies with the magnitude of current, temperature, and humidity. However, an impulse withstand voltage of about 100 volts (V) has only to be assumed, and dielectric breakdown can be avoided. Consequently, a spatial distance of 0.5 millimeters (mm) has only to be ensured, and a surface distance of about 1 mm has only to be ensured for a printed circuit board or the like.

Negative lighting surge and the like flow from the ground through the external conductor line and connection equipment into the central conductor line. However, the quarter wavelength open circuit with a length one fourth of the wavelength used by the external conductor line exhibits a high impedance to prevent lighting surge and the like from invading into the connection equipment.

In experiments in which the present system was connected to coaxial cable connection equipment, a voltage of 10 kilovolts (KV) was applied to between the central conductor line and the external conductor line using an impulse waveform of 10/200 microseconds (μs). Then, the voltage at the connection equipment was about 2.2 volts (V) at maximum and about 1.6V at minimum. Further, a value for reflection characteristic (Voltage Standing Wave Ratio) was 1.1 or less, and insertion loss was 0.1 decibels (dB) or less. As is apparent from these experiments, this system can be sufficiently put to practical use.

The present invention is configured as described above and thus has the following effects:

A signal of a predetermined wavelength used passes through a communication line and is insulated from the ground. On the other hand, signals for lighting surge and the like which have frequencies different from the predetermined one are hindered from passing through the communication line and are connected to the ground, to which the lighting surge is discharged. Therefore, connection equipment can be safely and reliably protected from lighting surge to obtain a good and reliable communication signal with few losses.

What is claimed is:

1. A communication line surge protecting system characterized in that a quarter wavelength open circuit for a wavelength used is disposed in each of a central conductor line and an external conductor line so as to allow a signal with a predetermined communication wavelength to pass therethrough, while blocking signals with frequency components of lighting surge and the like, and in which a ground line is further provided in the central conductor line and a quarter wavelength short circuit for the wavelength used is disposed in each of the ground line and the external conductor line so as to block the signal with the predetermined communication wavelength, while allowing the signals with the frequency components of lighting surge and the like to pass therethrough for grounding.

2. A communication line surge protecting system according to claim 1, characterized in that the quarter wavelength open circuit for the wavelength used is constructed by interposing an insulator with a length one fourth of the wavelength used, into each of the central conductor line and the external conductor line.

3. A communication line surge protecting system according to claim 1 or claim 2, characterized in that the quarter wavelength open circuit for the wavelength used is constructed by dividing each of the central conductor line and the external conductor line into pieces and interposing an insulator between the pieces of each of the central conductor line and the external conductor line.

* * * * *